US009605956B2

(12) United States Patent
Nishita

(10) Patent No.: US 9,605,956 B2
(45) Date of Patent: Mar. 28, 2017

(54) SURVEYING INSTRUMENT

(71) Applicant: Kabushiki Kaisha TOPCON, Tokyo-to (JP)

(72) Inventor: Nobuyuki Nishita, Tokyo-to (JP)

(73) Assignee: Kabushiki Kaisha TOPCON, Tokyo-to (JP)

( * ) Notice: Subject to any disclaimer, the term of this patent is extended or adjusted under 35 U.S.C. 154(b) by 134 days.

(21) Appl. No.: 14/709,509

(22) Filed: May 12, 2015

(65) Prior Publication Data
US 2015/0354954 A1   Dec. 10, 2015

(30) Foreign Application Priority Data

Jun. 4, 2014  (JP) .................. 2014-116086

(51) Int. Cl.
*G01C 15/00* (2006.01)
*G01C 5/00* (2006.01)

(52) U.S. Cl.
CPC ............. *G01C 5/00* (2013.01); *G01C 15/002* (2013.01)

(58) Field of Classification Search
CPC ................................ G01C 5/00; G01C 15/002
USPC .......................................... 33/290, 291, 292
See application file for complete search history.

(56) References Cited

U.S. PATENT DOCUMENTS

| 2004/0145720 | A1 | 7/2004 | Giger | |
|---|---|---|---|---|
| 2006/0176473 | A1* | 8/2006 | Yasutomi | G01C 1/00 356/141.3 |
| 2006/0197944 | A1* | 9/2006 | Yasutomi | G01C 15/00 356/141.3 |
| 2009/0119050 | A1* | 5/2009 | Hayashi | G01C 15/002 702/94 |
| 2010/0186243 | A1* | 7/2010 | Schumacher | G01B 21/22 33/228 |
| 2013/0293705 | A1* | 11/2013 | Schorr | G01C 15/002 348/135 |
| 2014/0190025 | A1 | 7/2014 | Giger et al. | |

(Continued)

FOREIGN PATENT DOCUMENTS

EP    1407227 B1   10/2008
JP    2004-108939 A    4/2004

(Continued)

*Primary Examiner* — G. Bradley Bennett
(74) *Attorney, Agent, or Firm* — Nields, Lemack & Frame, LLC

(57) ABSTRACT

The invention provides a surveying instrument, comprising a surveying instrument main body and a remote control operation unit being attachable to and detachable from the surveying instrument main body and capable of communicating with the surveying instrument main body. The remote control operation unit has an operation button, a directional angle sensor and a vertical sensor. The angle measurement value is transmitted to the remote control operation unit by pressing the operation button. The remote control operation unit calculates a difference between the directional angle and the vertical angle detected by the directional angle sensor and the vertical sensor before moving and the directional angle and the vertical angle after moving the remote control operation unit. An angle measurement value after moving is calculated based on the difference and the main body control unit rotates the telescope unit so as to become the angle measurement value after the moving.

9 Claims, 7 Drawing Sheets

(56) References Cited

U.S. PATENT DOCUMENTS

2015/0220085 A1\* 8/2015 Ohtomo ............... G08G 5/0069
                                                      701/2
2016/0252348 A1\* 9/2016 Momiyama .......... G01C 15/002

FOREIGN PATENT DOCUMENTS

JP      2013-156124 A    8/2013
WO      2013/020845 A1   2/2013

\* cited by examiner

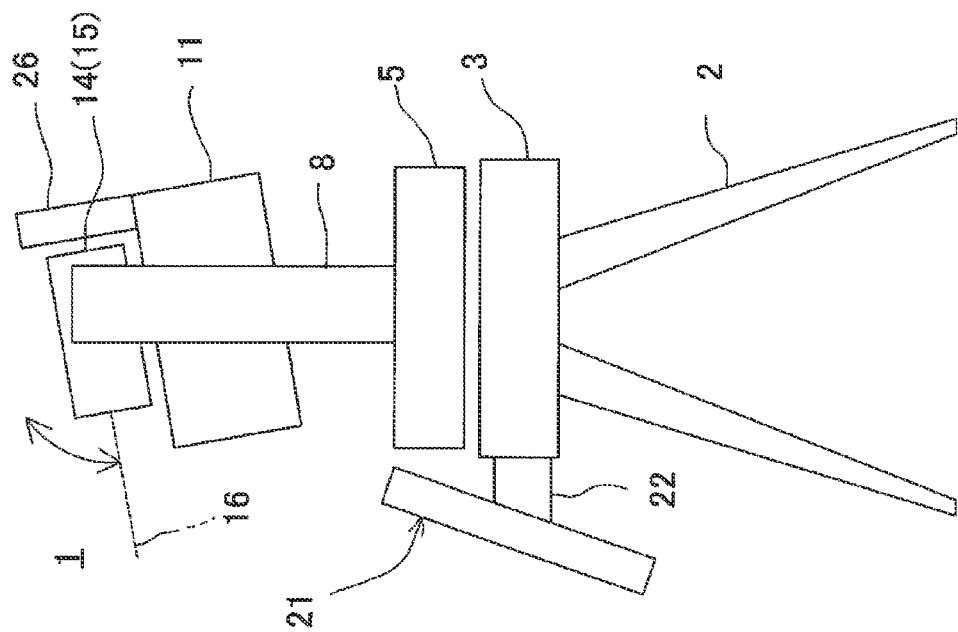
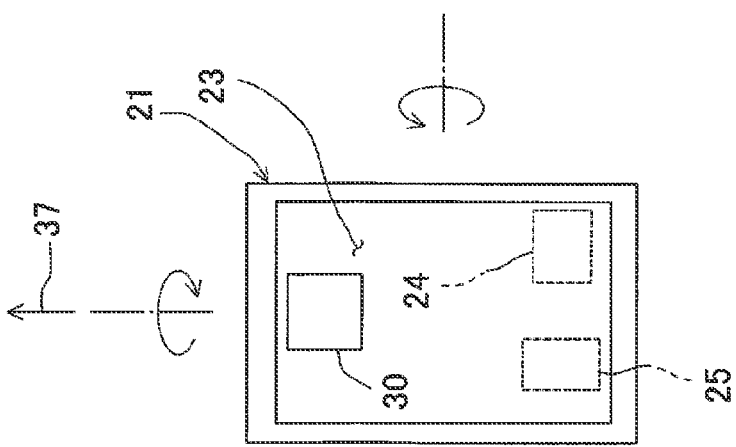

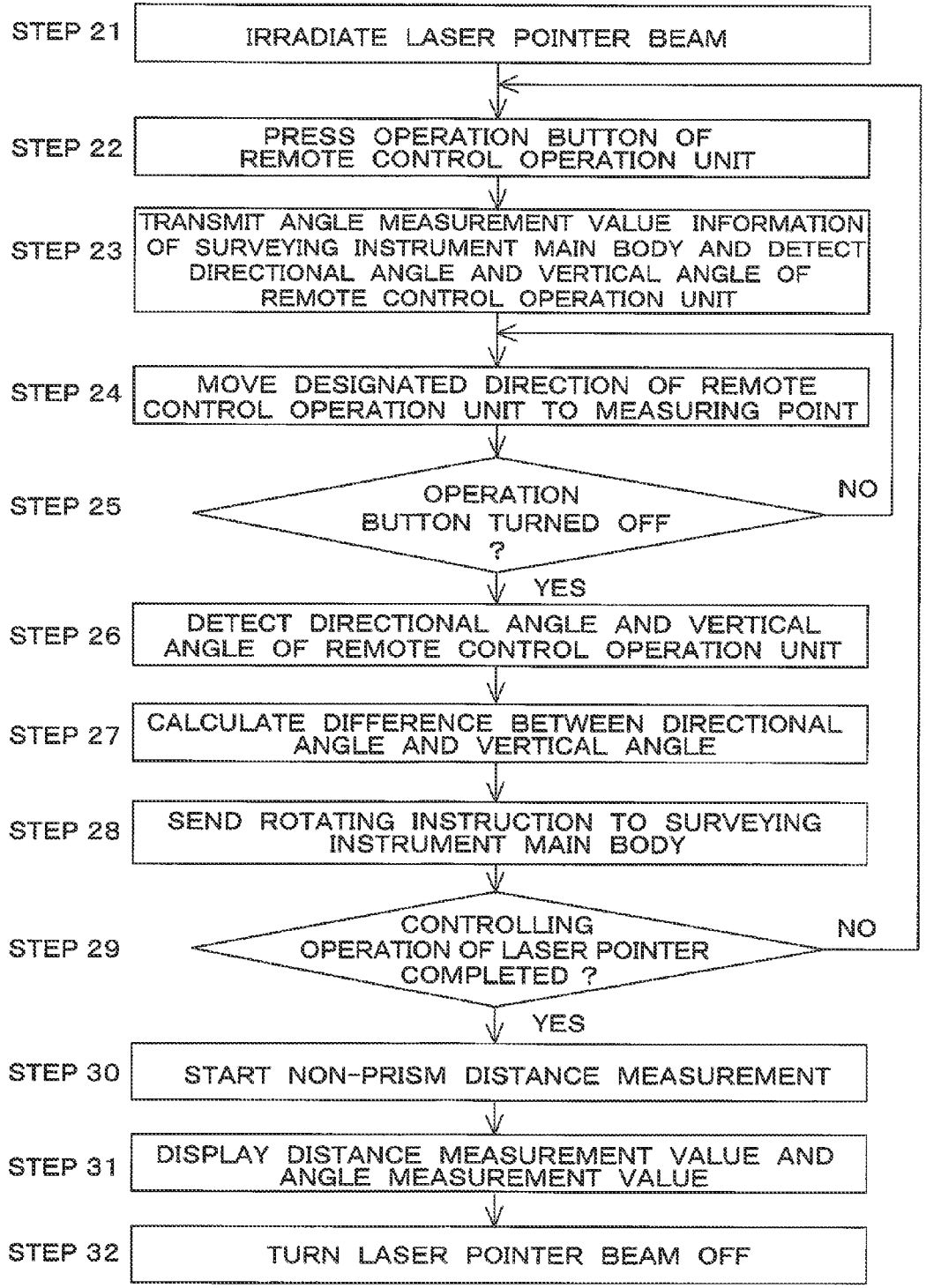

SURVEYING INSTRUMENT

BACKGROUND OF THE INVENTION

The present invention relates to a surveying instrument, by which it is possible to facilitate sighting to a target to be measured.

Conventionally, in a case where surveying operation is performed by a surveying instrument, which does not use a reflector such as a reflection prism and the like, a sighting of a point to be measured has been performed by a telescope.

A sighting using a telescope is usually performed by several methods. For instance, the following methods and the like have been known: a method to control a driving unit by an interface, such as a button or a slider on a screen of a remote control operation unit, or a method where a camera image as acquired by the surveying instrument main body is displayed on a remote control operation unit and a point to be sighted is specified on the image.

However, in a case where sighting is performed by means of a button or a slider on the screen, an operator cannot perform sighting by sensory operation because the sighting will be controlling on an interface on the screen. Further, in a case where a point to be sighted is selected from a screen, there are restrictions on a visual field or on a display resolving power of a camera. Further, in a case where it is difficult to recognize a monitor screen such as a case where illuminance is not sufficient in a measurement environment or a dynamic range is wide or the like because illuminance of a background is high, the working efficiency decreased.

SUMMARY OF THE INVENTION

It is an object of the present invention to provide a surveying instrument, by which the guiding to a measuring point can be easily performed and working efficiency can be improved.

To attain the object as described above, a surveying instrument according to the present invention comprises a surveying instrument main body and a remote control operation unit being attachable to and detachable from the surveying instrument main body and capable of communicating with the surveying instrument main body, wherein the surveying instrument, main body has a telescope unit for sighting a measuring point, a laser pointer irradiating unit for irradiating a laser pointer beam running in parallel to or on the same axis as an optical axis of the telescope unit, a rotation driving unit for rotating the telescope, unit in any direction as desired, an angle detector for detecting an angle measuring value, and a main body control unit for controlling the rotation driving unit to direct the telescope unit in a predetermined direction, wherein the remote control operation unit has an operation button, a directional angle sensor and a vertical sensor, the angle measurement value is transmitted to the remote control operation unit by pressing the operation button under the condition where the remote control operation unit is removed, wherein the remote control operation unit calculates a difference between the directional angle and the vertical angle detected by the directional angle sensor and the vertical sensor before moving and the directional angle and the vertical angle after the moving of the remote control operation unit, wherein either one of the remote control operation unit and the main body control unit calculates an angle measurement value after the moving based on the difference and the main body control unit rotates the telescope unit so as to become the angle measurement value after the moving.

Further, in the surveying instrument according to the present invention, the remote control operation unit calculates a difference between the directional angle, the vertical angle before the moving and the directional angle, the vertical angle after the moving at all times under a condition where the operation button is pressed and transmits a rotation instruction to the main body control unit at all times.

Further, in the surveying instrument according to the present invention, the remote control operation unit detects a directional angle and a vertical angle at the moment when the operation button is released, calculates a difference between the directional angle, the vertical angle at the moment when the operation button is pressed and the directional angle, the vertical angle at the moment when the operation button is released, and transmits a rotation instruction to the main body control unit.

Further, the surveying instrument according to the present invention further comprises an electro-optical distance meter, wherein an optical axis of the electro-optical distance meter is on the same axis or runs in parallel to the laser pointer beam.

Furthermore, in the surveying instrument according to the present invention, the remote control operation unit corrects a difference between the directional angle and the vertical angle before the moving and the directional angle and the vertical angle after the moving based on a predetermined sensitivity.

According to the present invention, the surveying instrument comprises a surveying instrument main body and a remote control operation unit being attachable to and detachable from the surveying instrument main body and capable of communicating with the surveying instrument main body, wherein the surveying instrument main body has a telescope unit for sighting a measuring point, a laser pointer irradiating unit for irradiating a laser pointer beam running in parallel to or on the same axis as an optical axis of the telescope unit, a rotation driving unit for rotating the telescope unit in any direction as desired, an angle detector for detecting an angle measuring value, and a main body control unit for controlling the rotation driving unit to direct the telescope unit in a predetermined direction, wherein the remote control operation unit has an operation button, a directional angle sensor and a vertical sensor, the angle measurement value is transmitted to the remote control operation unit by pressing the operation button under the condition where the remote control operation unit is removed, wherein the remote control operation unit calculates a difference between the directional angle and the vertical angle detected by the directional angle sensor and the vertical sensor before moving and the directional angle and the vertical angle after the moving of the remote control operation unit, wherein either one of the remote control operation unit and the main body control unit calculates an angle measurement value after the moving based on the difference and the main body control unit rotates the telescope unit so as to become the angle measurement value after the moving. As a result, it is possible to easily guide at a position distant from the surveying instrument main body, the sighting direction of the telescope unit to a measuring point while visually confirming an irradiating position of the laser pointer beam, and this contributes to the improvement of the working efficiency.

Further, according to the present invention, in the surveying instrument, the remote control operation unit calculates a difference between the directional angle, the vertical angle before the moving and the directional angle, the vertical angle after the moving at all times under a condition where the operation button is pressed and transmits a rotation instruction to the main body control unit at all times. As a result, it is possible to make the movement of the surveying instrument main body to follow the movement of the remote control operation unit, and this makes it possible to guide the laser pointer beam to the measuring point in easier manner.

Further, according to the present invention, in the surveying instrument, the remote control operation unit detects a directional angle and a vertical angle at the moment when the operation button is released, calculates a difference between the directional angle, the vertical angle at the moment when the operation button is pressed and the directional angle, the vertical angle at the moment when the operation button is released, and transmits a rotation instruction to the main body control unit. As a result, there is no need to calculate the difference by detecting a directional angle and a vertical angle after the moving at all times, and this makes it possible to reduce the load of processing in the remote control operation unit.

Further, according to the present invention, the surveying instrument, further comprises an electro-optical distance meter, wherein an optical axis of the electro-optical distance meter is on the same axis or runs in parallel to the laser pointer beam. As a result, when a distance measurement of the measuring point is to be carried out, it is simply necessary to guide the laser pointer beam to the measuring point, and this contributes to the improvement of the working efficiency when distance measurement is performed.

Furthermore, according to the present invention, in the surveying instrument, the remote control operation unit corrects a difference between the directional angle and the vertical angle before the moving and the directional angle and the vertical angle after the moving based on a predetermined sensitivity. As a result, it is possible to carry out precise guiding of the laser pointer beam, and the laser pointer beam can be guided in easy and accurate manner.

BRIEF DESCRIPTION OF THE DRAWINGS

FIG. 2 is a schematical side view of the surveying instrument according to an embodiment of the present invention.

FIG. 3 is a schematical drawing of a remote control operation unit used by the surveying instrument.

FIG. 9 is a flowchart to explain a measurement of a measuring point according to a second embodiment of the present invention.

DETAILED DESCRIPTION OF THE PREFERRED EMBODIMENTS

Description will be given below on embodiments of the present invention by referring to the attached drawings.

Figure 1:
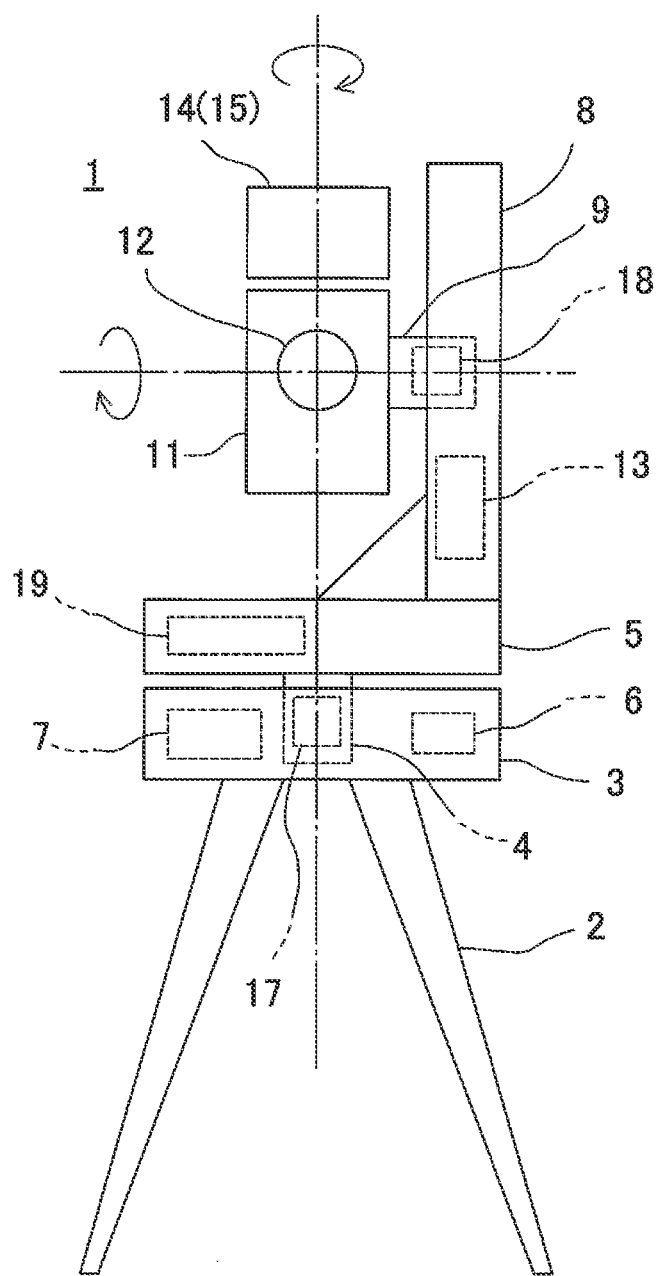
FIG. 1 is a schematical front view of a surveying instrument according to an embodiment of the present invention.

First, referring to FIG. 1 to FIG. 3, a description will be given on a surveying instrument according to a first embodiment of the present invention.

A surveying instrument 1 has a tripod 2, and a leveling unit 3 is provided on an upper end of the tripod 2. On the leveling unit 3, a rotation base 5 is rotatably mounted via a horizontal rotation shaft 4, and the leveling unit 3 has a leveling mechanism (not shown) to perform leveling in a vertical direction and a tilt sensor 6 (to be described later). Inside the leveling unit 3, a horizontal rotation driving unit 7 is incorporated so that the rotation base 5 is rotated around the horizontal rotation shaft 4 as the center by the horizontal rotation driving unit 7.

A frame case 8 is installed in a vertical direction on the rotation base 5, and a telescope unit 11 is rotatably mounted on the frame case 8 via a vertical rotation shaft 9, which has a horizontal axis.

The telescope unit 11 has a sighting telescope 12. The sighting telescope 12 has a visual field angle of about 5° and sights a measuring point. A sighting point of the sighting telescope 12 is shown by a reticle (not shown) provided on the sighting telescope 12.

A vertical rotation driving unit 13 is incorporated in the frame case 8, and the telescope unit 11 is rotated in the vertical direction around the vertical rotation shaft 9 as the center by the vertical rotation driving unit 13.

The horizontal rotation driving unit 7 and the vertical rotation driving unit 13 make up together a rotation driving unit. By a cooperative operation of the horizontal rotation driving unit 7 and the vertical rotation driving unit 13, the rotation driving unit can direct the telescope unit 11 in a direction as desired.

On an upper surface of the telescope unit 11, an electro-optical distance meter (EDM) 14 is provided, and a laser pointer irradiating unit 15 is incorporated in the electro-optical distance meter 14. The electro-optical distance meter 14 can perform non-prism distance measurement, and the laser pointer irradiating unit 15 is designed to irradiate a laser beam (a laser pointer beam) 16 of a visual light. An optical axis of the laser pointer beam 16 coincides with distance measuring optical axis of the electro-optical distance meter 14.

Further, the telescope unit 11 is integrated with the electro-optical distance meter 14. The optical axis of the electro-optical distance meter 14, i.e. the optical axis of the laser pointer beam 16 runs in parallel to the optical axis of the telescope unit 11, and a distance between the optical axes of the laser pointer beam. 16 and the telescope unit 11 is already known. It is to be noted that it may be so arranged that the optical axis of the telescope unit 11 is in the same axis as the optical axis of the laser pointer beam 16, and that the optical axis of the telescope unit 11 and the optical axis of the laser pointer beam 16 run in parallel to a distance measuring optical axis of the electro-optical distance meter 14. Also, the electro-optical distance meter 14 may be provided on the telescope unit 11 via an attachment (not shown), or the direction of the optical axis of the electro-optical distance meter 14 may be adjustable by the attachment. In this case, the electro-optical distance meter 14 as commercially available may be used.

A horizontal angle detector 17 is provided on the horizontal rotation shaft 4, and it is so arranged that the horizontal angle detector 17 can detect a rotation angle of the horizontal rotation shaft 4, i.e. a horizontal rotation angle of the rotation base 5. Also, a vertical angle detector 18 is provided on the vertical rotation shaft 9 and the vertical angle detector 18 can detect a rotation angle of the vertical rotation shaft 9, i.e. a vertical rotation angle of the telescope unit 11.

Further, inside the rotation base 5, a main body control unit 19 is provided. It is to be noted that if there is room for the main body control unit, the main body control unit 19 may be provided at other site such as the telescope unit 11 and the like. The main body control unit 19 may be designed to control the horizontal rotation driving unit 7 and the vertical rotation driving unit 13, and to control distance measurement by the electro-optical distance meter 14, to control the laser pointer irradiating unit 15, to measure a horizontal angle and a vertical angle based on detection results of the horizontal angle detector 17 and the vertical angle detector 18, and to perform data communication to and from a remote control operation unit 21 as to be described later. It is to be noted that excepting the remote control operation unit 21, the leveling unit 3, the rotation base 5, the frame case 8, the telescope unit 11, etc make up together a surveying instrument main body.

It is so arranged that the remote control operation unit 21 can be attached to or removed from the leveling unit 3 via an attachment 22 (see FIG. 2).

As shown in FIG. 3, the remote control operation unit 21 is designed as a portable type (hand-held type) for example a smart phone or a tablet and the like, where the remote control operation unit 21 can be operated by one hand in a state where the other hand has the remote control operation unit 21. The remote control operation unit 21 has a display unit 23 and an operation unit (the display unit 23 works as a touch panel and also serves as an operation unit), and a communication unit (to be described later) and the like to perform data communication to and from the main body control unit 19. Also, the remote control operation unit 21 is provided with a vertical sensor 24 and a directional angle sensor 25 to detect posture and direction of the remote control operation unit 21.

As shown in FIG. 2, it may be arranged in such manner that a deflecting optical unit 26 is provided on the telescope unit 11 and the optical axis of the telescope unit 11 may be deflected by the deflecting optical unit 26 so that a part of the light of the electro-optical distance meter 14 is sent back to the telescope unit 11 and so that a sighting point of the telescope unit 11, the measuring point of the electro-optical distance meter 14 and irradiating point of the laser pointer irradiating unit 15 coincide with each other.

Since the telescope unit 11 is rotated in the horizontal direction and in the vertical direction by an operation from the remote control operation unit 21, the operation enables the surveying instrument 1 to perform operations as required such as an operation to determine sighting direction, an operation to determine measuring points, or an operation to perform measurement and the like. Under the condition that the remote control operation unit 21 is installed on the surveying instrument 1, the surveying instrument 1 is in a condition that the telescope unit 11 is directly operated via the remote control operation unit 21. Under the condition that the remote control operation unit 21 is detached, the surveying instrument 1 is in a condition that the telescope unit 11 is remotely controlled via the remote control operation unit 21.

Under a condition that an engageable and disengageable type connector (not shown) is provided on each of the remote control operation unit 21 and the attachment 22, and the remote control operation unit 21 is installed on the attachment 22, it may be so arranged that the remote control operation unit 21 is directly and electrically connected to the main body control unit 19 via connecting of a connector.

Figure 4:
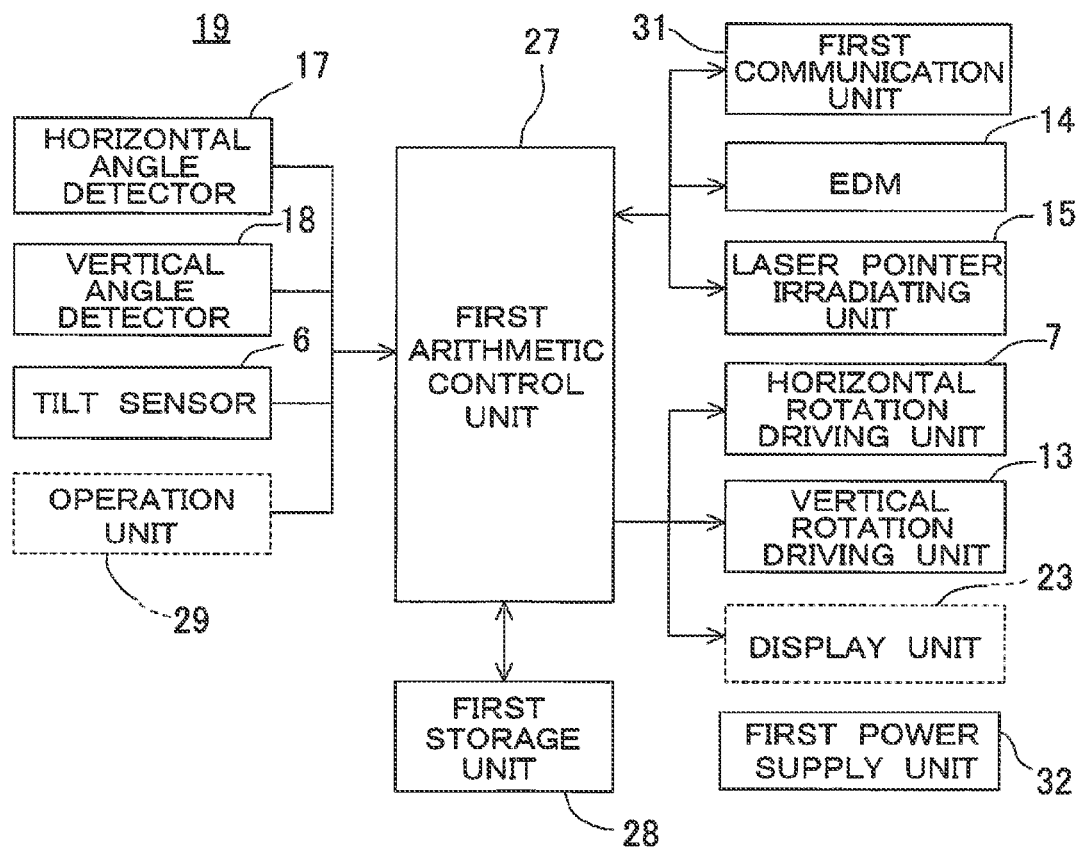
FIG. 4 is a block diagram of a main body control unit of the surveying instrument.
Figure 5:
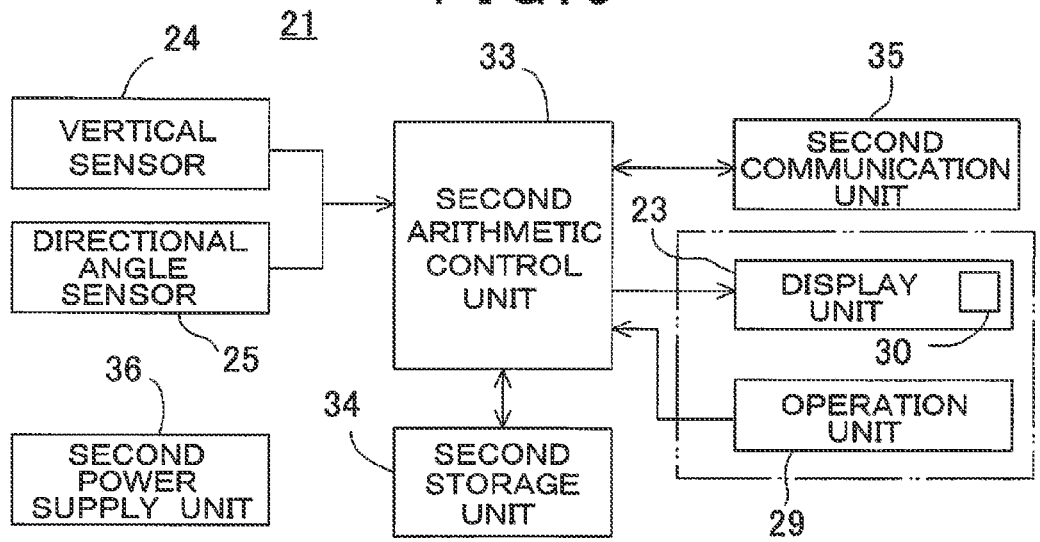
FIG. 5 is a block diagram of a remote control operation unit of the surveying instrument.

Referring to FIG. 4 and FIG. 5, further description will be given on the main body control unit 19 and the remote control operation unit 21.

First, referring to FIG. 4, description will be given on the main body control unit 19.

The main body control unit 19 primarily comprises a first arithmetic control unit 27, a first storage unit 28, the horizontal angle detector 17, the vertical angle detector 18, the tilt sensor 6, an operation unit 29, a first communication unit 31, the electro-optical distance meter 14, the horizontal rotation driving unit 7, the vertical rotation driving unit 13, the display unit 23, a first power supply unit 32, etc.

Detection signals from the horizontal angle detector 17, the vertical angle detector 18, and the tilt sensor 6 are inputted to the first arithmetic control unit 27. At the first communication unit 31, a communication is controlled by the first arithmetic control unit 27, and a control command is issued from the first communication unit 31, and the data received by the first communication unit 31 is inputted to the first arithmetic control unit 27.

The first arithmetic control unit 27 controls the electro-optical distance meter 14, and the result of a measurement at the electro-optical distance meter 14 is inputted to the first arithmetic control unit 27. The first arithmetic control unit 27 controls the horizontal rotation driving unit 7 and the vertical rotation driving unit 13, and makes the telescope unit 11 and the electro optical distance meter 14 to rotate in a direction as required.

The detection result from the horizontal angle detector 17 and the vertical angle detector 18 are inputted to the first arithmetic control unit 27. Based on the detection results of the horizontal angle detector 17 and the vertical angle detector 18, the rotation angle in the horizontal direction and the rotation angle in the vertical direction of the deflecting optical unit 26, the electro-optical distance meter 14 and the laser pointer irradiating unit 15 are measured.

The detection result of the tilt sensor 6 is inputted to the first arithmetic control unit 27, and a leveling operation of the leveling unit 3 is controlled, and based on the detection results of the tilt sensor 6 and the vertical angle detector 18, the vertical angle of the telescope unit 11 is measured.

An operation unit and a display unit as provided on the remote control operation unit 21, as to be described later, double as the display unit 23 and the operation unit 29.

In the first storage unit 28, various types of programs are stored. These programs include: a control program necessary for controlling the electro-optical distance meter 14, the first communication unit 31, the horizontal rotation driving unit 7 and the vertical rotation driving unit 13, an angle measuring program for specifying a tilt angle, a horizontal rotation angle, a vertical rotation angle, etc. based on the detection results from the horizontal angle detector 17, the vertical angle detector 18 and the tilt sensor 6, and a communication control program for controlling the communication by the first communication unit 31, etc. Further, measurement data and the like such as the distance measurement results, the angle measurement results, etc. by the electro-optical distance meter 14 are stored in the first storage unit 28.

The first power supply unit 32 is a chargeable battery such as a lithium-ion battery and the like, and the first power supply unit 32 supplies electric power as necessary to the first arithmetic control unit 27, the first communication unit 31, the horizontal rotation driving unit 7, the vertical rotation driving unit 13, and the like.

Referring to FIG. 5, description will be given below on the remote control operation unit 21.

The remote control operation unit 21 primarily comprises the display unit 23, the operation unit 29, a second arithmetic control unit 33, a second storage unit 34, the vertical sensor 24, the directional angle sensor 25, a second communication unit 35, a second power supply unit 36, and the like.

Detection signals from the vertical sensor 24 and the directional angle sensor 25 are inputted to the second arithmetic control unit 33, and the second arithmetic control unit 33 calculates posture of the remote control operation unit 21 based on the signals from the vertical sensor 24 and the directional angle sensor 25.

The second communication unit 35 receives the data transmitted from the main body control unit 19 and inputs the data to the second arithmetic control unit 33. Further, the second communication unit 35 transmits information of a posture and the like of the remote control operation unit 21 as calculated at the second arithmetic control unit 33 and the like to the main body control unit 19.

It is so arranged that the data transmitted from the main body control unit 19, for instance, or information and the like as calculated by the second arithmetic control unit 33 or the like are displayed on the display unit 23.

Further, the display unit 23 is designed to perform any operation as desired by using the display unit 23 as touch panel, or the functions of the operation unit 29 may be concentrated in the display unit 23. The display unit 23 has an operation button 30 for remotely controlling the telescope unit 11 and for performing to guide the laser pointer beam 16.

In the second storage unit 34, various types of programs and the like are stored. These programs include: a communication control program for controlling communication by the second communication unit 35, a program to make the display unit 23 to display and to fulfill functions of the display unit 23 as an operation unit, a program for calculating an information relating to the posture of the remote control operation unit 21, such as a direction and a tilting, etc. of the remote control operation unit 21 based on the signals from the vertical sensor 24 and the directional angle sensor 25, a program for calculating the moving amount of the telescope unit 11 based on the information and other programs. Also, in the second storage unit 34, data of distance measurement and angle measurement as determined by the surveying instrument 1 are stored.

The second power supply unit 36 is a chargeable battery such as lithium-ion battery and the like, and electric power as necessary is supplied to the second arithmetic control unit 33, the second communication unit 35, the display unit 23, etc.

When the operation button 30 of the display unit 23 is pressed, i.e. at the moment when the operation button 30 is pressed by the vertical sensor 24, a vertical angle θ of the designated direction 37 of the remote control operation unit 21 before moving, is detected. Also, at the moment when the operation button 30 is pressed by the directional angle sensor 25, directional angle φ of the designated direction 37 of the remote control operation unit 21 before the moving is detected.

Also, when the operation button 30 is pressed, a push-down signal is transmitted to the surveying instrument 1 via the second communication unit 35 and the push-down signal is received via the first communication unit 31. A horizontal angle H of the telescope unit 11 is detected by the horizontal angle detector 17 at the moment when the operation button 30 is pressed, a vertical angle V of the telescope unit 11 is detected by the vertical angle detector 18 at the moment when the operation button 30 is pressed. That is, an angle measurement value (H, V) of the telescope unit 11 is measured, and the result is transmitted to the remote control operation unit 21.

It is to be noted that after the operation button 30 is pressed, that is, after the moving, a directional angle and a vertical angle (φ', θ') of the remote control operation unit 21 are detected at all times as long as the operation button 30 is pressed. The second arithmetic control unit 33 calculates a difference (φ'−φ, θ'−θ) at all times between a directional angle and a vertical angle (φ', θ') as detected after the moving and a directional angle and a vertical angle (φ, θ) as detected before the moving.

Based on the sensitivity as determined in advance or the sensitivity as set up by the operator, the second arithmetic control unit 33 corrects the calculated difference (φ'−φ, θ'−θ) to the angle displacement amount (ΔH, ΔV) of the telescope unit 11, and a rotation instruction is transmitted to the main body control unit 19 at all times so that an angle measurement value of the telescope unit 11 will be (H+ΔH, V+ΔV).

Based on the rotation instruction from the remote control operation 21, the main body control unit 19 drives the horizontal rotation driving unit 7 and the vertical rotation driving unit 13.

Figure 6:
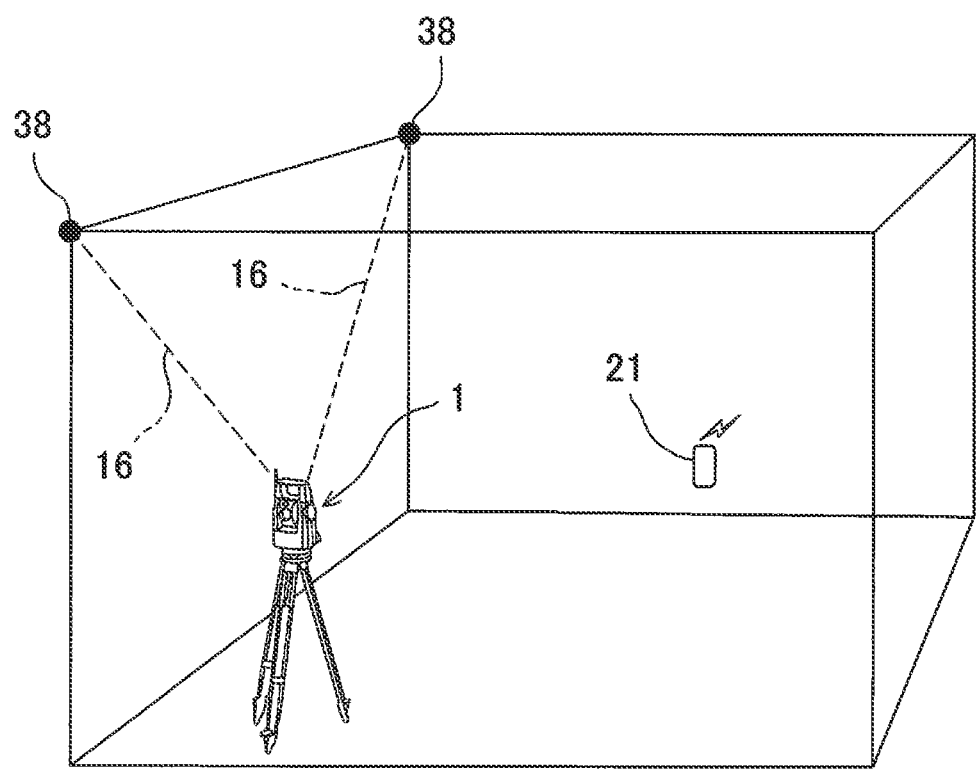
FIG. 6 is an explanatory drawing to explain a remote control operation by the remote control operation unit.

It is so arranged that the above processing is continuously carried out until the operation button 30 is released. That is, when the remote operation control unit 21 is moved while the operator presses the operation button 30, the telescope unit 11 is rotated in the horizontal direction and in the vertical direction by following the movement of the remote control operation unit 21. Therefore, as shown in FIG. 6, the operator is able to guide the laser pointer beam 16 to the measuring point 38 at a position separated from the telescope unit 11.

Figure 7:
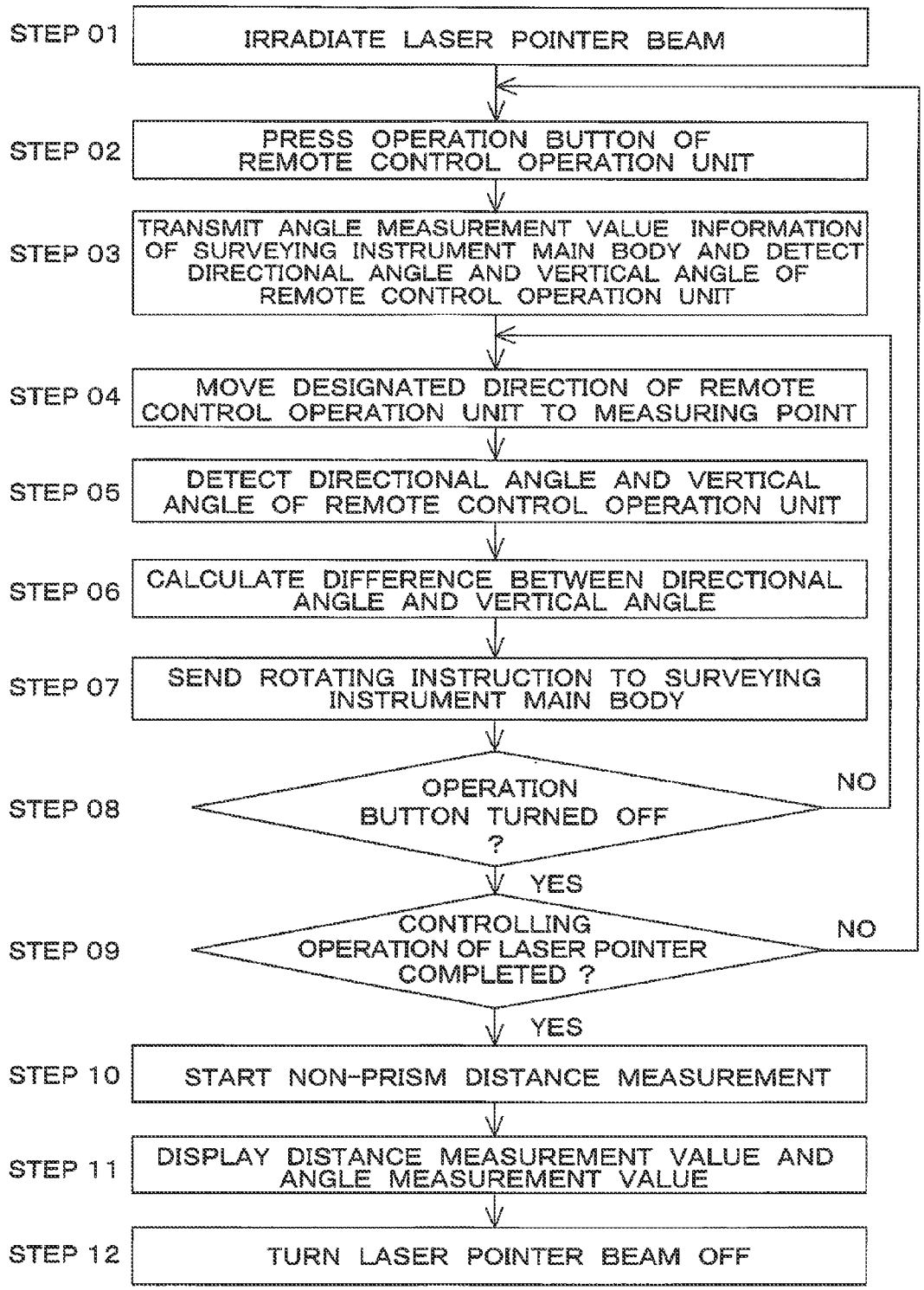
FIG. 7 is a flowchart to explain a measurement of a measuring point according to a first embodiment of the present invention.

Next, by referring to the flowchart shown in FIG. 7, a description will be given below on a case where the telescope unit 11 is remotely operated by the remote control operation unit 21 and the measurement is performed by guiding the laser pointer beam 16 to the measuring point 38. It is to be noted that in the description as given below, an explanation is given on a case where the display unit 23 is used as the operation unit 29.

(Step 01) First, when an instruction for irradiating the laser pointer beam 16 is inputted from the display unit 23 of the remote control operation unit 21, the instruction for irradiating is inputted to the main body control unit 19. The laser pointer irradiating unit 15 is driven and the laser pointer beam 16 is irradiated.

At this moment, angle measurement values (H, V) of the telescope unit 11 are detected and updated at all times based on the detection results by the tilt sensor 6, the horizontal angle detector 17 and the vertical angle detector 18.

(Step 02) Irradiating by the laser pointer beam 16 is started, next by pressing the operation button 30 of the display unit 23, the guiding process of the laser pointer beam 16 is started.

(Step 03) When the operation button 30 is pressed, angle measurement values (H, V) of the telescope unit 11, at the moment when the operation button 30 is pressed, are transmitted to the remote control operation unit 21. Also, based on the detection results of the vertical sensor 24 and the directional angle sensor 25, the directional angle and the vertical angle (φ, θ) of the designated direction 37 of the remote control operation unit 21 are detected at the moment when the operation button 30 is pressed.

(Step 04) Under the condition where the operation button 30 has been pressed, the designated direction 37 of the remote control operation unit 21 is moved to the measuring direction.

(Step 05) Under the condition where the operation button 30 is pressed, by moving the remote control operation unit 21, the directional angle and the vertical angle ($\phi'$, $\theta'$) after moving are detected at all times.

(Step 06) When the directional angle and the vertical angle ($\phi'$, $\theta'$) after the moving have been detected, the second arithmetic control unit 33 calculates a difference ($\phi'-\phi$, $\theta'-\theta$) between the directional angle, the vertical angle ($\phi$, $\theta$) before the moving and the directional angle, the vertical angle ($\phi'$, $\theta'$) after the moving.

(Step 07) The second arithmetic control unit 33 corrects the calculated difference ($\phi'-\phi$, $\theta'-\theta$) to an angle displacement amount ($\Delta H$, $\Delta V$) of the telescope unit 11 based on the predetermined sensitivity, and the rotation instruction is transmitted at all times to the main body control unit 19 so that the angle measurement value of the telescope unit 11 will be (H+$\Delta H$, V+$\Delta V$).

In this case, the sensitivity for correcting the difference ($\phi'-\phi$, $\theta'-\theta$) to the angle displacement amount ($\Delta H$, $\Delta V$) may be so arranged that the difference ($\phi'-\phi$, $\theta'-\theta$) and the angle displacement amount ($\Delta H$, $\Delta V$) will be equal to each other or that the difference ($\phi'-\phi$, $\theta'-\theta$) will be about 1/10 of the angle displacement amount ($\Delta H$, $\Delta V$).

(Step 08) The procedure of Step 04 to Step 07 as described above is continuously performed until the operation button 30 is released. That is, under the condition where the operation button 30 is pressed, the telescope unit 11 is by following the movement of the designated direction 37 of the remote control operation unit 21.

(Step 09) After the operation button 30 is released, it is judged whether the irradiating position of the laser pointer beam 16 is coincident with the measuring point 38. Is a case where the irradiating position of the laser pointer beam 16 is not coincident with the measuring point 38, the procedure in Step 02 to Step 08 is carried out acain.

(Step 10) In a case where she irradiating position of the laser pointer beam 16 is coincident, with the measuring point 38, by inputting an instruction for distance measurement, the guiding procedure of the laser pointer beam 16 is completed and a non-prism distance measurement to the measuring point 38 is performed by the electro-optical distance meter 14.

(Step 11) When the non-prism distance measurement with respect to the measuring point 38 is completed, the angle measurement value at the moment of the non-prism distance measurement is displayed on the display unit 23 together with the distance measurement value.

(Step 12) Finally, when a turn-off instruction for the laser pointer beam 16 is inputted from the display unit 23, the turn-off instruction is inputted to the main body control unit 19, and the laser pointer beam 16 is turned off and the measurement of the measuring point 38 is completed.

As described above, in the first embodiment of the present invention, by pressing the operation button 30 of the display unit 23, the directional angle and the vertical angle ($\phi$, $\theta$) of the remote control operation unit 21 at the present moment are detected. The difference ($\phi'-\phi$, $\theta'-\theta$), when the designated direction 37 of the remote control operation unit 21 is moved in an arbitrary direction, is corrected to the angle displacement amount ($\Delta H$, $\Delta V$) and is added to the angle measurement value (H, V) in real time. By driving the horizontal rotation driving unit 7 and the vertical rotation driving unit 13, the moving of the telescope unit 11 is enabled to follow the movement of the remote control operation unit 21 continuously as long as the operation button 30 is pressed.

Therefore, by using the remote control operation unit 21, the operator can guide the sighting direction of the telescope unit 11 to the measuring point 38 sensuously while visually confirming the irradiating position of the laser pointer beam 16. As a result, even within she limited visual field of the sighting telescope 12 or a screen surface or the like, or in a case where it is difficult to recognize the measuring point 38 because illuminance is not sufficient or dynamic range is wide or the like because illuminance of the background is high, the laser pointer beam 16 can be guided easily to the measuring point 38, and it is possible to improve the working efficiency.

Because the optical axis of the laser pointer beam 16 coincides with the optical axis of the electro-optical distance meter 14 and it is possible to control the rotation of the telescope unit 11 from a separated position by the remote control operation unit 21, the operator is capable of simply performing to guide the laser pointer beam 16 near the measuring point 38. Therefore, even when the measuring point 38 and the position of the telescope unit 11 are distant from each other, the laser pointer beam 16 can be guided to the measuring point 38 in quick and reliable manner.

It would be sufficient that the operation button 30 of the display unit 23 is pressed and under this condition the designated direction 37 of the remote control operation unit 21 is moved. As a result, there is no need to have a special operation to guide the laser pointer beam 16, and this makes it possible to reduce the burden on the operator.

Further, because the optical axis of the electro-optical distance meter 14 is on the same axis as the laser pointer beam 16, in a case where a distance measurement is performed with respect to the measuring point 38, it would be sufficient to guide the laser pointer beam 16 toward the measuring point 38. This makes it possible to improve the working efficiency in the distance measurement.

In the first embodiment, the calculating difference ($\phi'-\phi$, $\theta'-\theta$) is corrected to the angle displacement amount ($\Delta H$, $\Delta V$) based on the sensitivity as set up in advance or on the sensitivity as inputted by the operator. However, it may be so arranged that non-prism distance measurement is performed by the electro-optical distance meter 14 in parallel to the detection of the directional angle and the vertical angle ($\phi'$, $\theta'$) after the moving and a sensitivity may be automatically adjusted based on the result of distance measurement. Because the sensitivity is adjusted automatically, the laser pointer beam 16 can be guided in easier manner.

Figure 8:
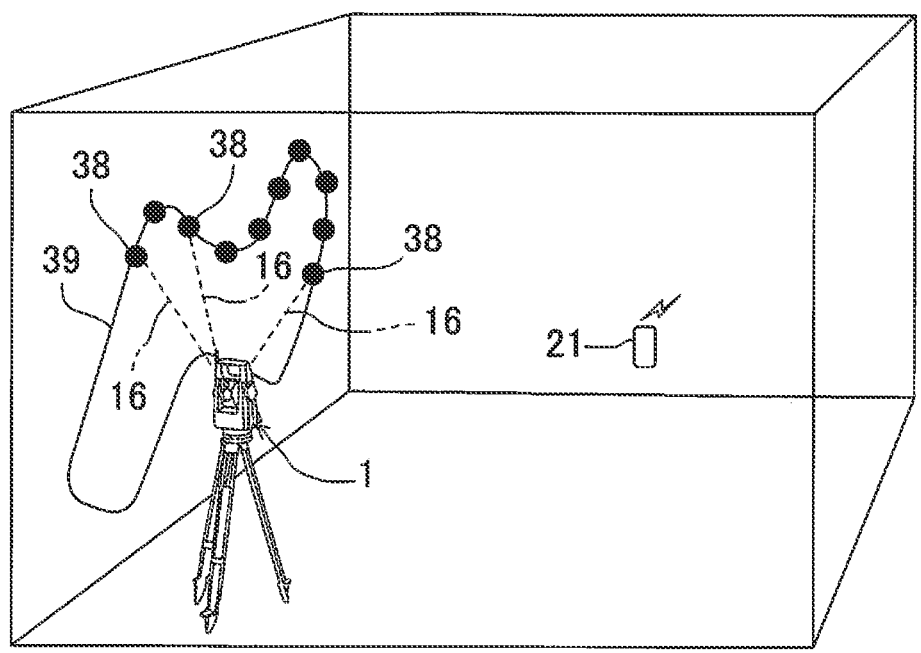
FIG. 8 is an explanatory drawing to explain the remote control operation by the remote control operation unit.

Also, as shown in FIG. 8, by performing the angle measurement by the horizontal angle detector 17 and the vertical angle detector 18, and by performing the distance measurement by the electro-optical distance meter 14, while guiding the laser pointer beam 16, a three-dimensional locus of a target to be measured 39 can be traced in non-contact manner.

In the first embodiment, the remote control operation unit 21 calculates the difference ($\phi'-\phi$, $\theta'-\theta$) and converts the difference ($\phi'-\phi$, $\theta'-\theta$) to the angle displacement amount ($\Delta H$, $\Delta V$), and transmits the rotation instruction to the main body control unit 19 so that the angle measurement value of the telescope unit 11 will be (H+$\Delta H$, V+$\Delta V$). However, it may also be arranged in such a manner that the remote control operation unit 21 transmits the difference ($\phi'-\phi$, $\theta'-\theta$) to the main body control unit 19, and further the main body control unit 19 determines the angle displacement amount (ΔH, ΔV) and may rotate the telescope unit 11 so that the angle measurement value will be (H+ΔH, V+ΔV).

Next, by referring to the flowchart as shown in FIG. 9, description will be given on a processing of measurement according to a second embodiment wherein a laser pointer beam 16 is guided to a measuring point 38 and a measurement is performed. It is to be noted that the arrangement of the surveying instrument 1 in the second embodiment is the same as in the first embodiment, and the same component as shown in FIG. 1 to FIG. 3 is referred by the same symbol, and the detailed description is not given here.

(Step 21) First, when an instruction for irradiating the laser pointer beam 16 is inputted from a display unit 23 of a remote control operation unit 21, the instruction for irradiating is inputted, to a main body control unit 19. A laser pointer irradiating unit 15 is driven and the laser pointer beam 16 is irradiated.

(Step 22) Irradiating by the laser pointer beam 16 is started, next by pressing an operation button 30 of the display unit 23, the guiding process of the laser pointer beam 16 is started.

(Step 23) When the operation button 30 is pressed, the angle measurement values (H, V) of the telescope unit 11, at the moment when the operation button 30 is pressed, are transmitted to the remote control operation unit 21. Also, based on the results of detection by a vertical sensor 24 and a directional angle sensor 25, the directional angle and the vertical angle (φ, θ) of a designated direction 37 of the remote control operation unit 21 are detected at the moment when the operation button 30 is pressed.

(Step 24) Under the condition that the operation button 30 is pressed, the designated direction 37 of the remote control operation unit 21 is moved to the measuring direction.

(Step 25) When the designated direction 37 is shifted to the measuring direction, it is then judged as to whether the operation button 30 has been released or not.

(Step 26) When it is judged that the operation button has been released, the directional angle and the vertical angle (φ', θ') after the moving are detected by the vertical sensor 24 and the directional angle sensor 25.

(Step 27) When the directional angle and the vertical, angle (φ', θ') after the moving (at the moment when the operation button has been released) are detected, the second arithmetic control unit 33 calculates the difference (φ'-φ, θ'-θ) between the directional angle and the vertical angle (φ, θ) before the moving and the directional angle and the vertical angle (φ', θ') after the moving.

(Step 28) Based on the predetermined sensitivity, the second arithmetic control unit 33 corrects the calculated difference (φ'-φ, θ'-θ) to the angle displacement amount (ΔH, ΔV) of the telescope unit 11 and a rotation instruction is transmitted to the main body control unit 19 so that the measured angle value of the telescope unit 11 will be (H+ΔH, V+ΔV). That is, the telescope unit 11 is rotated by an amount of the moving while the operation button 30 is pressed.

(Step 29) After the telescope unit is rotated it is judged as to whether or not the irradiating position of the laser pointer beam 16 is coincident with the measuring point 38. In a case where the irradiating position of the laser pointer beam 16 is not coincident with the measuring point 38, the procedure of the Steps 22 to 28 is carried out again.

(Step 30) In a case where the irradiating position of the laser pointer beam 16 is coincident with the measuring point 38, by inputting an instruction for distance measurement, the guiding of the laser pointer beam 16 is completed and a non-prism distance measurement to the measuring point 38 is performed by the electro-optical distance meter 14.

(Step 31) When the non-prism distance measurement with respect to the measuring point 38 is completed, the angle measurement value at the moment of the non-prism distance measurement is displayed on the display unit 23 together with the distance measurement value.

(Step 32) Finally, when the turn-off instruction for the laser pointer beam 16 is inputted from the display unit 23, the turn-off instruction is inputted to the main body control unit 19, and she laser pointer beam 16 is turned off and the measurement of the measuring point 38 is completed.

Also, in the second embodiment, by using the remote control operation unit 21, the operator can guide the sighting direction of the telescope unit 11 to the measuring point 38 according to his sense while visually watching the irradating position of the laser pointer beam 16. As a result, it is possible to guide the laser pointer beam 16 easily to the measuring point 38, and this contributes to the improvement of the working efficiency.

Also, in the second embodiment, the directional angle and the vertical angle (φ', θ') can be detected only after the moment when the operation button 30 has been released, and the difference (φ'-φ, θ'-θ) can be calculated, and thereby there is no need to detect the directional angle and the vertical angle (φ', θ') at all times. This makes it possible so reduce the load of processing to be applied on the remote control operation unit 21.

It is to be noted that in both of the first embodiment and the second embodiment, the electro-optical distance meter 14 is integrated with the laser pointer irradiating unit 15, while only the laser pointer irradiating unit 15 may be used on the telescope unit 11. In a case where the distance measurement is not needed while the angle measurement value is needed, only the laser pointer irradiating unit 15 may be provided on the telescope unit 11.

Also, in the first embodiment and the second embodiment, a portable type terminal is used, such as a smart phone and the like, in which the operation unit 29 is integrated, with the display unit 23, while it is needless to say that a general portable wireless terminal may be used where the display unit 23 and the operation unit 29 are provided separately.

The invention claimed is:

1. A surveying instrument, comprising a surveying instrument main body and a remote control operation unit being attachable to and detachable from said surveying instrument main body and capable of communicating with said surveying instrument main body, wherein said surveying instrument main body has a telescope unit for sighting a measuring point, a laser pointer irradiating unit for irradiating a laser pointer beam running in parallel to or on the same axis as an optical axis of said telescope unit, a rotation driving unit for rotating said telescope unit in any direction as desired, an angle detector for detecting an angle measuring value, and a main body control unit for controlling said rotation driving unit to direct said telescope unit in a predetermined direction, wherein said remote control operation unit has an operation button, a directional angle sensor and a vertical sensor, said angle measurement value is transmitted to said remote control operation unit by pressing said operation button under the condition where said remote control operation unit is removed, wherein said remote control operation unit calculates a difference between the directional angle and the vertical angle detected by said directional angle sensor and said vertical sensor before moving and the directional angle and the vertical angle after the moving of said remote control operation unit, wherein either one of said remote control operation unit and said main body control unit calculates an angle measurement value after the moving based on said difference and said main body control unit rotates said telescope unit so as to become said angle measurement value after the moving.

2. A surveying instrument according to claim 1, wherein said remote control operation unit calculates a difference between said directional angle, said vertical angle before the moving and said directional angle, said vertical angle after the moving at all times under a condition where said operation button is pressed and transmits a rotation instruction to said main body control unit at all times.

3. A surveying instrument according to claim 1, wherein said remote control operation unit detects a directional angle and a vertical angle at the moment when said operation button is released, calculates a difference between the directional angle, the vertical angle at the moment when said operation button is pressed and the directional angle, the vertical angle at the moment when said operation button is released, and transmits a rotation instruction to said main body control unit.

4. A surveying instrument according to claim 1, further comprising an electro-optical distance meter, wherein an optical axis of said electro-optical distance meter is on the same axis or runs in parallel to said laser pointer beam.

5. A surveying instrument according to claim 1, wherein said remote control operation unit corrects a difference between said directional angle and said vertical angle before the moving and said directional angle and said vertical angle after the moving based on a predetermined sensitivity.

6. A surveying instrument according to claim 2, further comprising an electro-optical distance meter, wherein an optical axis of said electro-optical distance meter is on the same axis or runs in parallel to said laser pointer beam.

7. A surveying instrument according to claim 3, further comprising an electro-optical distance meter, wherein an optical axis of said electro-optical distance meter is on the same axis or runs in parallel to said laser pointer beam.

8. A surveying instrument according to claim 2, wherein said remote control operation unit corrects a difference between said directional angle and said vertical angle before the moving and said directional angle and said vertical angle after the moving based on a predetermined sensitivity.

9. A surveying instrument according to claim 3, wherein said remote control operation unit corrects a difference between said directional angle and said vertical angle before the moving and said directional angle and said vertical angle after the moving based on a predetermined sensitivity.

* * * * *